C. H. MAIER.
MUSIC SHEET ADVERTISING DEVICE.
APPLICATION FILED NOV. 26, 1920.

1,390,535.

Patented Sept. 13, 1921.

INVENTOR
Clarence H. Maier
BY
Warren S. Orton
ATTORNEYS

UNITED STATES PATENT OFFICE.

CLARENCE H. MAIER, OF NEW YORK, N. Y.

MUSIC-SHEET ADVERTISING DEVICE.

1,390,535.  Specification of Letters Patent.  Patented Sept. 13, 1921.

Application filed November 26, 1920. Serial No. 426,369.

*To all whom it may concern:*

Be it known that I, CLARENCE H. MAIER, a citizen of the United States, and resident of New York city, in the county of New York and State of New York, have invented certain new and useful Improvements in Music-Sheet Advertising Devices, of which the following is a specification.

The invention relates to an article of manufacture in the form of a piece of sheet music designed to contain advertising matter and intended primarily to be distributed as a gift by advertising concerns.

One of the objects of the invention is to provide a simple form of sheet music gift which will have printed thereon a piece of music so related to the text of advertising matter disposed thereon that the part of the article having the advertisement thereon can not be thrown away except that parts which are desired to be retained, such as the front cover and the music piece itself, must also be thrown away.

Still another object of the invention is to provide an arrangement of the textual part of the disclosure so that no advertising matter is visible while the piece of music is being played or sung, and at the same time that the maximum available amount of space may be utilized for advertising purposes without providing extra sheets for this purpose.

Incidental to the preceding general object, it is a further desideratum of the invention to provide in a sheet music book of the insert sheet type, a disposition of the music displaying part so that the entire piece of music may be read without the necessity of turning the insert sheet.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings:—

Figure 1:
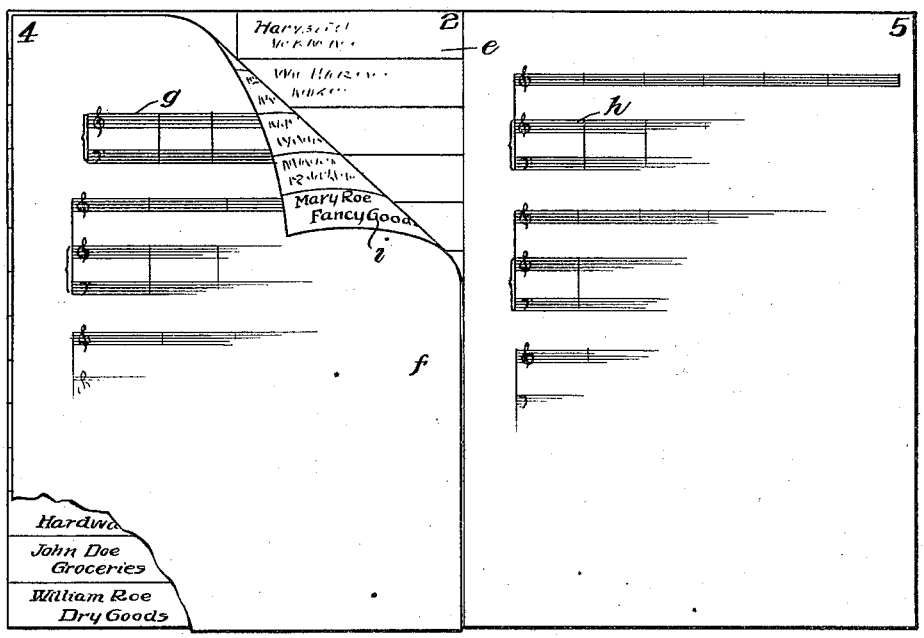
Figure 2:
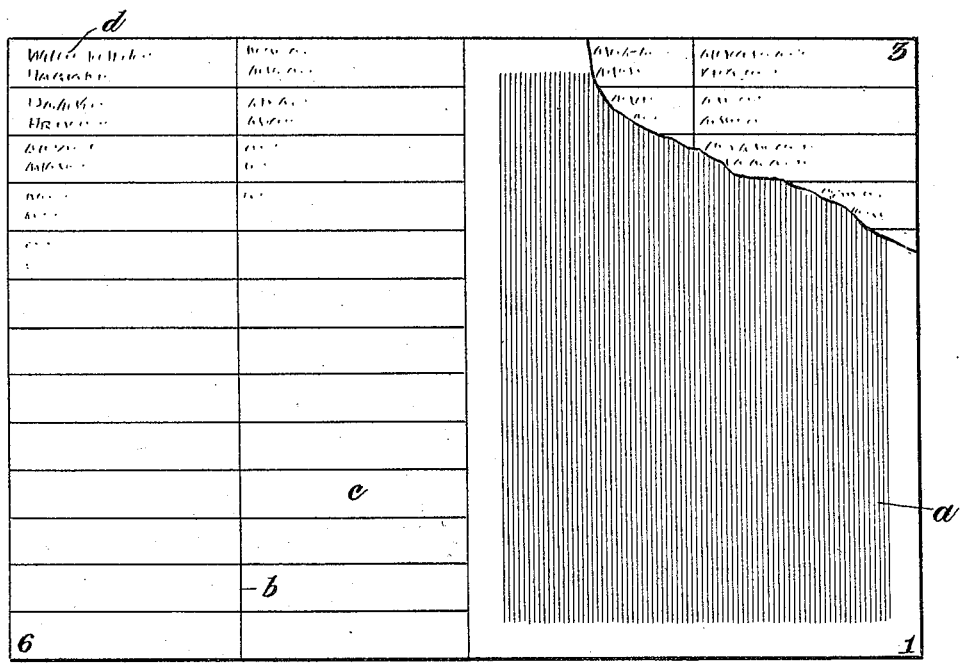

Figure 1 is a view in elevation of a preferred embodiment of the invention shown in position to expose the music piece with an upper part of the insert sheet turned down and a lower part broken away to show the rear side of the front cover sheet; and Fig. 2 is a similar view of the reversed side of the showing in Fig. 1 with a part of the front cover sheet torn away to expose the side of the insert sheet opposite to the side displayed in Fig. 1.

In the following description and in the claims, parts will be identified by specific names for convenience of expression but they are intended to be as generic in their application to similar parts as the art will permit.

It will be understood that the sheet music book herein illustrated is of the conventional form of such article and includes a single four-page sheet and a single insert in the form of a two-page sheet one half the size of the four-page sheet. For convenience of identification the pages are numbered in book order, the four-page sheet being numbered 1, 2, 5 and 6, of which page 1 constitutes the front cover sheet and is usually of some artistic appearance and not infrequently printed in colors, herein indicated symbolically in Fig. 2 by the reference character $a$; page 6 constitutes the back cover sheet and in the present disclosure is shown to be ruled off by line $b$ to form spaces $c$ each of which contain a text $d$ preferably forming an advertising matter. Sheet 2, being the reversed side of the front cover sheet, is similarly ruled and blocked off to contain a text $c$ of advertising matter.

The page 2 cannot be thrown away without also throwing away the front cover sheet which the donee must retain in order to maintain a neat appearance to the music sheet book. The insert sheet $f$ identified in order, as pages 3 and 4 in the book, has a size as shown in Fig. 1 to fit over and hide the advertising matter $c$ on page 2 when the book is opened to expose pages 4 and 5. The exposed pages 4 and 5 have a text $g$ and $h$ thereon constituting a complete piece of music and this music is so arranged that the entire piece can be sung or played without turning the insert sheet nor in fact, any of the sheets in the book. The side of the insert sheet opposite from the side having the music thereon is provided with a text $i$ constituting advertisements and similarly the reverse side of the music page 5, that is the back cover page 6, is provided with the advertising matter $d$.

It will be appreciated from this disclosure that the advertising matter on page 2 cannot be thrown away because of the necessity to preserve the front cover on the opposite side. Similarly the advertising matter on pages 3 and 6 cannot be thrown away because the music piece is on the opposite side and it is the music which makes the gift of value to the donee.

It is intended that the advertising concerns distributing the gifts herein disclosed shall procure advertisements for every month or for other periods of time from merchants and other advertising concerns in a given neighborhood, and in this way sell space on pages two, three and six of the next issue of the gift. On pages four and five is arranged some popular or classic piece of music or other valuable textual matter. Then through some approved system of distribution, the article such as the sheet music book is distributed each month, or other period of time to the homes in the neighborhood where sheet music is used.

The next month another edition, with a new song or piece of music and with a revised listing of advertisements is printed and distributed. A donee of such an article would hesitate in throwing away the article due to the value of the music piece and so long as the article is on the piano or on the music cabinet the advertising matter is almost sure to be presented to any person fingering the sheet music. However, when the book is opened into the position shown in Fig. 1, and with the sheets held in flat position so that the music will be visible to the player or singer, no advertising matter is visible and there is nothing visible to offend the esthetic taste of the artist.

While reference has been made in this disclosure to the text on pages two, three and six as advertising matter it is obviously within the scope of the invention to have the text relate to other matters and in general it is to be understood that the invention resides in the organization of the text rather than in the subject matter of the text on the several pages.

While I have shown and described, and have pointed out in the annexed claim, certain novel features of my invention, it will be understood that various omissions, substitutions and changes in the form and details of the card system illustrated and in its operation may be made by those skilled in the art without departing from the spirit of the invention.

Having thus described my invention, I claim:

A sheet music book adapted to constitute a gift, for distribution by advertising concerns, said book including a four-page sheet and an insert in the form of a two-page sheet, said four page sheet identified in order as pages 1, 2, 5 and 6, of which page 1 constitutes a front cover sheet and sheet 6 constitutes a back cover sheet, page 2 on the reverse side of the front cover page having a text thereon constituting an advertisement which advertisement sheet cannot be thrown away without also throwing away the front cover page, said insert sheet identified in order as pages 3 and 4 in the book having a size to fit over and hide the advertising matter on page 2 when the book is open to expose pages 4 and 5 said exposed pages 4 and 5 having a text thereon constituting a complete piece of music whereby the piece can be sung or played without turning any of the sheets, the reverse sides of said pages 4 and 5 being respectively page 3 and the back cover page 6 having a text thereon constituting advertisements which cannot be thrown away without also throwing away the piece of music.

Signed at New York city, in the county of New York and State of New York this 18th day of November, A. D. 1920.

CLARENCE H. MAIER.